(12) United States Patent
Saiki et al.

(10) Patent No.: US 7,120,264 B2
(45) Date of Patent: Oct. 10, 2006

(54) SOUND REPRODUCING APPARATUS

(75) Inventors: Shuji Saiki, Uda-gun (JP); Sawako Usuki, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 175 days.

(21) Appl. No.: 10/836,254

(22) Filed: May 3, 2004

(65) Prior Publication Data

US 2004/0228501 A1 Nov. 18, 2004

(30) Foreign Application Priority Data

May 13, 2003 (JP) ............................... 2003-134080

(51) Int. Cl.
*H04R 25/00* (2006.01)
(52) U.S. Cl. ...................... 381/184; 381/152; 381/182; 381/186
(58) Field of Classification Search ................ 381/150, 381/152, 182, 184, 345, 349, 350, 351, 396, 381/398, 423; 181/148, 164, 183
See application file for complete search history.

(56) References Cited

U.S. PATENT DOCUMENTS 6,023,515 A * 2/2000 McKee et al. .............. 381/150

6,427,017 B1 7/2002 Toki

FOREIGN PATENT DOCUMENTS

| JP | 60-191599 | | 9/1985 |
|---|---|---|---|
| JP | H1-159487 | * | 11/1989 |
| JP | 8-275293 | | 10/1996 |
| JP | 2000-152385 | | 5/2000 |
| JP | 2001-136270 | | 5/2001 |
| JP | 2003-122482 | | 4/2003 |

* cited by examiner

*Primary Examiner*—Sinh Tran
*Assistant Examiner*—Brian Ensey
(74) *Attorney, Agent, or Firm*—Wenderoth, Lind & Ponack, L.L.P.

(57) ABSTRACT

A sound reproducing apparatus includes a display unit, a board 22, a diaphragm panel 23, and an electroacoustic transducer 26. The display unit displays an image on a display surface. The board 22 is composed of a material which transmits visible light and arranged such that a first space is provided between the display surface of the display unit and the board 22. The diaphragm panel 23 is composed of a material which transmits visible light and arranged on the opposite side of the board 22 from the display unit such that a second space is provided between the board 22 and the diaphragm panel 23. The electroacoustic transducer 26 emits sound into the second space.

5 Claims, 11 Drawing Sheets

SOUND REPRODUCING APPARATUS

BACKGROUND OF THE INVENTION

1. Field of the Invention

The present invention relates to a sound reproducing apparatus, and more particularly to a sound reproducing apparatus having a display means and being capable of acoustically driving a transparent diaphragm panel.

2. Description of the Background Art

Conventionally, there has been devised a sound reproducing apparatus for reproducing sound from a display screen. For example, there exists a sound reproducing apparatus which causes a transparent diaphragm panel provided in front of a display screen to vibrate to emit sound. This sound reproducing apparatus will be described below with reference to FIG. 11.

FIG. 11 is an external perspective view of a television set having a conventional sound reproducing apparatus. In FIG. 11, the television set includes a cabinet 1, a cathode ray tube 2, a front panel 3, a driver 4, and sound slits 5. The front panel 3 is mounted in front of the cathode ray tube 2. The front panel 3 is composed of a material with high optical transmittance, such as glass or transparent acrylic. The driver 4 is an electromagnetic-type speaker and is directly connected to the back of the front panel 3. A plurality of sound slits 5 (four sound slits in FIG. 11) are provided around the perimeter of the cathode ray tube 2. The television set shown in FIG. 11 reproduces sound by a method of directly driving the transparent diaphragm panel by means of the driver 4.

The operation of the sound reproducing apparatus shown in FIG. 11 will be described below. When an electrical signal is applied to the driver 4, the driver 4 causes vibration. Since the driver 4 is directly mounted to the front panel 3, the vibration caused by the driver 4 is mechanically transmitted to the front panel 3, causing the front panel 3 to vibrate. Specifically, if the electrical signal applied to the driver 4 is an audio signal, sound is reproduced from the front panel 3 mounted in front of the cathode ray tube 2. Since the front panel 3 is composed of a material with high optical transmittance, the front panel 3 does not degrade an image reproduced on the cathode ray tube 2. In this manner, the television set shown in FIG. 11 can simultaneously reproduce images and sounds.

If the volume of a space between the front panel 3 and the cathode ray tube 2 is small, the air pressure of the space will increase, whereby the limit of low-frequency sound reproduction in sound reproduction is increased. In order to prevent this problem, the sound slits 5 are provided. Specifically, sound coming from the back of the front panel 3 passes through the sound slits 5 and then is emitted into the cabinet 1. Thus, an increase in the air pressure of the space can be avoided by means of the sound slits 5.

While the sound reproducing apparatus shown in FIG. 11 is used as a television set, there also exists a sound reproducing apparatus which can be used as a mobile telephone. Such a sound reproducing apparatus reproduces sound by causing an outer case which is directly mounted to the mobile telephone to vibrate by means of the driver. This sound reproducing apparatus will be described below with reference to FIG. 12.

FIG. 12 is an external view of a mobile telephone having a conventional sound reproducing apparatus. In FIG. 12, the mobile telephone includes an outer case 10, an antenna 11, a soundboard 12, a driver 13, and a display screen 14. The soundboard 12 is formed on the upper front of the outer case 10 such that the perimeter thereof is thin (not shown). The driver 13 is directly mounted to the back of the soundboard 12. The display screen 14 is provided on the front of the outer case 10 and below the soundboard 12.

The operation of the sound reproducing apparatus shown in FIG. 12 will be described below. When an electrical signal is applied to the driver 13, the driver 13 causes vibration. The vibration caused by the driver 13 is directly transmitted to the soundboard 12 formed on the outer case 10, causing the soundboard 12 to vibrate, thereby reproducing sound.

In the sound reproducing apparatus shown in FIG. 11, the driver 4 is mounted in a location around the perimeter of the front panel 3 so as not to block the display screen of the cathode ray tube 2. On the other hand, in a sound reproducing apparatus which employs a method for directly driving the font panel 3 by means of the driver 4, if the driver 4 is mounted in a location around the perimeter of the front panel 3, the quality of reproduced sound may be degraded.

Moreover, since the front panel 3 acts not only as a diaphragm panel for emitting sound but also as a protection panel for protecting the cathode ray tube 2, the front panel 3 requires moderate strength. Therefore, the front panel 3 needs to be configured to have a certain thickness. This increases the weight of the front panel 3, reducing the vibration of the front panel 3 brought about by the driver 4, resulting in a reduction in reproduced sound pressure. Thus, in the sound reproducing apparatus shown in FIG. 11, the efficiency of the reproduced sound pressure with respect to the driver is very low as compared with that of conventional speakers.

The sound reproducing apparatus shown in FIG. 12, on the hand, cannot be appropriately applied to recent mobile telephones in which larger display screens are highly demanded. Specifically, in the sound reproducing apparatus shown in FIG. 12, the display screen 14 and the soundboard 12 are provided in different locations, which hinders the formation of a larger display screen 14 due to the presence of the soundboard 12. In addition, since the display screen 14 is provided in a different location from where sound is reproduced, the user cannot get the sense that the sound is being reproduced from the display screen 14.

SUMMARY OF THE INVENTION

Therefore, an object of the present invention is to provide a sound reproducing apparatus capable of reproducing high quality sound while giving the user the sense that the sound is being reproduced from a display means.

The present invention has the following features to attain the object mentioned above.

The present invention is directed to a sound reproducing apparatus comprising a display unit, a board, a diaphragm panel, and at least one electroacoustic transducer. The display unit displays an image on a display surface. The display unit includes, for example, a display device such as a liquid crystal display device, a picture in which an image is illustrated, and a photograph. The board is composed of a material which transmits visible light and is arranged such that a first space is provided between the display surface of the display unit and the board. The diaphragm panel is composed of a material which transmits visible light and is arranged on the opposite side of the board from the display unit such that a second space is provided between the board and the diaphragm panel. The electroacoustic transducer emits sound into the second space.

Typically, the board has a sound hole, and the electroacoustic transducer emits sound into the second space through the sound hole.

The sound reproducing apparatus may further comprise a case having an opening which is covered by the diaphragm panel. The case contains therein the board, the display unit, and the electroacoustic transducer.

The diaphragm panel may be composed of a touch panel.

The sound reproducing apparatus may further comprise: an antenna for receiving a signal; and a signal processing unit. The signal processing unit performs predetermined signal processing on the signal received by the antenna and inputs the processed signal to the electroacoustic transducer.

Further, in the sound reproducing apparatus, a number of the at least one electroacoustic transducer may be two. In this case, the signal processing unit inputs to one of the two electroacoustic transducers a signal received by the antenna if the signal includes an incoming speech sound signal, and inputs to the other one of the two electroacoustic transducers a signal received by the antenna if the signal includes a signal other than an incoming speech sound signal.

According to the present invention, the diaphragm panel is acoustically driven by the sound emitted into the second space from the electroacoustic transducer. In the case where the diaphragm panel is acoustically driven, the mounting position of the electroacoustic transducer does not adversely affect sound reproduction. Thus, a reduction in sound quality caused by the mounting position of the electroacoustic transducer will not occur. In addition, since the electroacoustic transducer can be freely arranged, the electroacoustic transducer will not block the display unit and the user can get the sense that the sound is being reproduced from the display unit.

These and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1A:
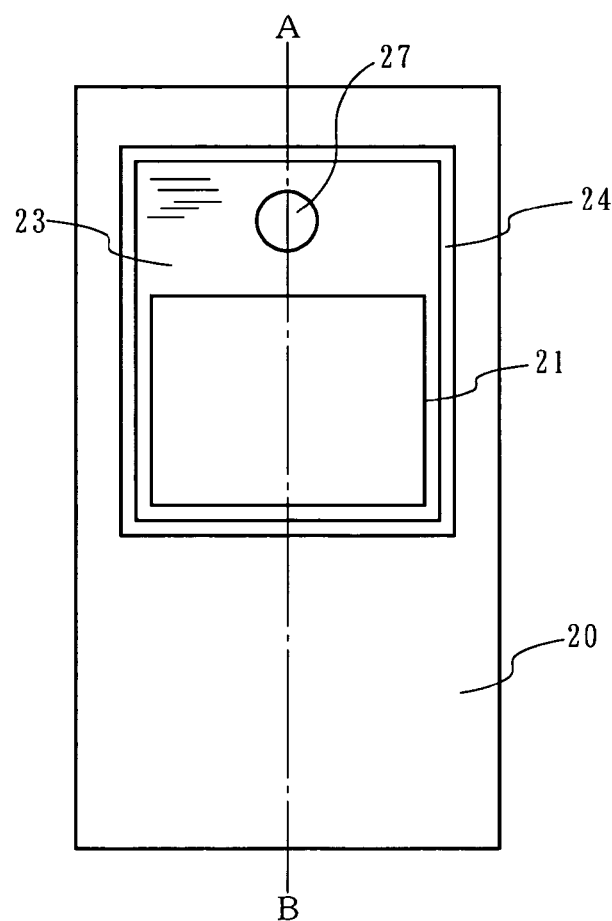
FIG. 1A and FIG. 1B are diagrams illustrating a configuration of a sound reproducing apparatus according to a first embodiment.
Figure 1B:
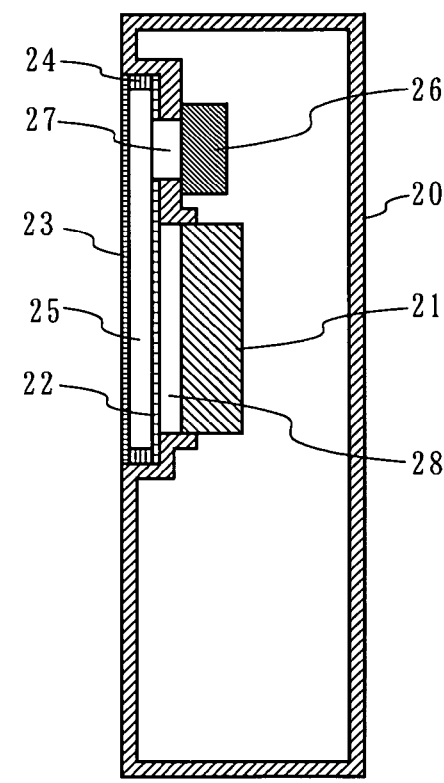

First, a sound reproducing apparatus according to a first embodiment of the present invention will be described below. FIGS. 1A and 1B are diagrams illustrating a configuration of the sound reproducing apparatus according to the first embodiment. FIG. 1A is a plan view of the sound reproducing apparatus, and FIG. 1B is a cross-sectional view of the sound reproducing apparatus taken along a line A-B of FIG. 1A. The sound reproducing apparatus according to the first embodiment can be implemented as a mobile terminal apparatus such as a mobile telephone or PDA.

In FIGS. 1A and 1B, the sound reproducing apparatus includes an outer case 20, a display device 21, a board 22, a diaphragm panel 23, a spacer 24, and an electroacoustic transducer 26. The display device 21 may be a liquid crystal display device, for example. The board 22 and the diaphragm panel 23 are composed of materials which transmit visible light. The board 22 is composed of glass or acrylic resin, for example. The diaphragm panel 23 is composed of acrylic resin or PET (polyethylene terephthalate), for example.

In FIGS. 1A and 1B, the outer case 20 has an opening, the size of which is almost the same as the size of the display device 21. The display device 21 is provided so as to cover the opening. Thus, the perimeter of the display device 21 is connected to the opening. The display device 21 is arranged inside the outer case 20. The board 22 is provided to the outer case 20 on the outside (on the left side in FIG. 1B) of the display device 21. A first space is provided between the display device 21 and the board 22. The board 22 is connected to the outer case 20 at its perimeter. The diaphragm panel 23 is provided to the outer case 20 on the outside (on the left side in FIG. 1B) of the board 22. That is, the diaphragm panel 23 is placed on the opposite side of the board 22 from the display device 21. The board 22 and the diaphragm panel 23 are adhered to each other at their perimeters by means of the spacer 24, thereby providing a second space between the board 22 and the diaphragm panel 23. A sound hole 27 is provided in the board 22 and the outer case 20. The electroacoustic transducer 26 is placed on the opposite side of the board 22 from the second space 25. The electroacoustic transducer 26 is connected to the outer case 20 so as to cover the sound hole 27. In another configuration, the electroacoustic transducer 26 may be directly connected to the board 22. The electroacoustic transducer 26 is arranged inside the outer case 20, as is the display device 21.

Figure 2:
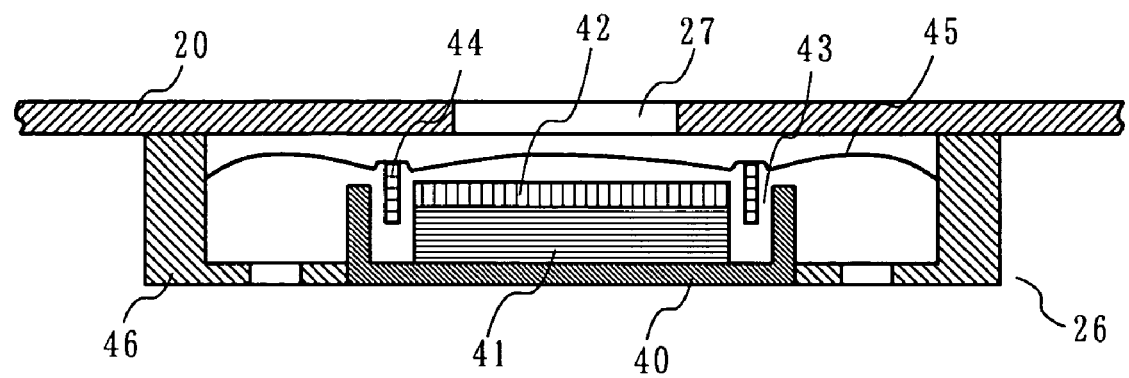
FIG. 2 is a cross-sectional view of an electroacoustic transducer according to the first embodiment.

FIG. 2 is a cross-sectional view of the electroacoustic transducer 26 shown in FIGS. 1A and 1B. In FIG. 2, the electroacoustic transducer 26 includes a pot type yoke 40, a magnet 41, a plate 42, a voice coil 44, a diaphragm 45, and a frame 46. The frame 46 is connected to the perimeter of a sound hole 27 of the outer case 20 so as to cover the sound hole 27. The yoke 40 is adhered to the center of the frame 46 at its outer underside (the underside surface in FIG. 2). The magnet 41 is provided at the center of the yoke 40. The plate 42 is arranged on the top surface of the magnet 41. The yoke 40 and the plate 42 are arranged such that a magnetic air gap 43 is provided between the inner surface of the yoke 40 and the outer surface of the plate 42. The diaphragm 45 is adhered to the frame 46 at its perimeter. The voice coil 44 is adhered to the diaphragm 45 so as to be inserted in the magnetic air gap 43.

The operation of the sound reproducing apparatus configured in the above-described manner will be described below. When an electrical signal is applied to the voice coil 44 inserted in the magnetic air gap 43 of the electroacoustic transducer 26, a driving force is generated by the voice coil 44. By the driving force, the diaphragm 45 joined to the voice coil 44 is caused to vibrate, thereby generating sound. The sound emitted from the diaphragm 45 is propagated in the second space 25 through the sound hole 27. Accordingly, the diaphragm panel 23 is caused to vibrate by the sound pressure of the second space 25. That is, the diaphragm panel 23 is acoustically driven and caused to vibrate. By this, sound is emitted from the diaphragm panel 23. In the case where the diaphragm panel 23 is acoustically driven, sound is propagated through the second space, and therefore the mounting position of the electroacoustic transducer 26, which serves as a driver, does not adversely affect the quality of reproduced sound. Accordingly, it is possible to freely select the mounting position of the electroacoustic transducer 26 and to prevent degradation of the quality of reproduced sound.

In the case where the perimeter of the diaphragm panel 23 is fixed with the spacer 24, the diaphragm panel 23 vibrates in such a manner that the diaphragm panel 23 itself bends. In the case where the spacer 24 is composed of a suspension made of an elastic body, the diaphragm panel 23 vibrates in such a manner that the diaphragm panel 23 itself creates a piston action. In the present invention, the diaphragm panel 23 may be caused to vibrate in either of the above two manners.

When the diaphragm panel 23 is caused to vibrate by the sound pressure of the sound emitted into the second space 25, the sound pressure equivalent to that applied to the diaphragm panel 23 is also applied to the board 22. Thus, as with the diaphragm panel 23, the force to cause the board 22 to vibrate is created by the sound pressure. If the board 22 vibrates, the energy of the sound emitted into the second space 25 is distributed to the diaphragm panel 23 and the board 22. Therefore, in this case, the sound pressure level reproduced from the diaphragm panel 23 is lower than that obtained when the board 22 does not vibrate. Specifically, the energy to cause the diaphragm panel 23 to vibrate is taken away by vibration of the board 22, resulting in a reduction in vibration of the diaphragm panel 23. Therefore, it is necessary to prevent the board 22 from vibrating by the sound pressure in the second space 25.

As a method of preventing vibration of the board 22, the thickness of the board 22 may be increased so as to provide a sufficient strength to the board 22. The increase in the thickness of the board 22 may, however, lead to an increase in the thickness of the sound reproducing apparatus, which is unfavorable, especially for mobile terminal apparatuses that seek a reduction in their size and weight. As another method of preventing vibration of the board 22, the board 22 may be closely stuck to the display screen of the display device 21 with an adhesive agent. However, if the board 22 and the display screen are bonded together, the optical transmittance may be reduced by a bonding layer, resulting in degradation in the image quality of the display screen. For this reason, the first space 28, as shown in FIG. 1B, is required between the board 22 and the display screen.

In the first embodiment, the vibration of the board 22 is suppressed by sealing the first space 28. That is, the vibration of the board 22 is suppressed by the acoustic stiffness of the air in the first space 28. By substantially sealing the first space 28, even if the board 22 has a thickness equal to or less than that of the diaphragm panel 23, the vibration of the board 22 can be suppressed. In this manner, a reduction in the sound pressure of the diaphragm panel 23 caused by vibration of the board 22 can be prevented.

Since the board 22 and the diaphragm panel 23 are composed of transparent materials, the user can see the display screen of the display device 21 from the outside of the sound reproducing apparatus. In addition, since the electroacoustic transducer 26 is arranged on the lateral side of the display device 21, the electroacoustic transducer 26 does not block the display screen.

As described above, the sound reproducing apparatus according to the first embodiment can give the user the sense that the sound is being reproduced from the display screen, while preventing the degradation of the quality of reproduced sound. In addition, by substantially sealing the first space, a reduction in the pressure of reproduced sound can be prevented. Further, by providing the first space and the second space, the board can be made thinner, achieving a reduction in the thickness of the sound reproducing apparatus.

In the sound reproducing apparatus according to the first embodiment, three components, a board 22; a diaphragm panel 23; and a spacer 24, can be produced as one unit. Specifically, the three components are assembled while producing the main unit separately from the three components, and then an assemblage of the three components is mounted to the main unit. This facilitates the production of a sound reproducing apparatus. In addition, in the sound reproducing apparatus according to the first embodiment, since the display screen of the display device is covered by the board 22 and the diaphragm panel 23, the display screen can be more securely protected as compared to the case without the board 22.

In the first embodiment, the outer shape of the electroacoustic transducer 26 is circular; however, the shape may be elliptical or rectangular, by which the display screen of the display device 21 can be made larger.

(Second Embodiment)

Figure 3:
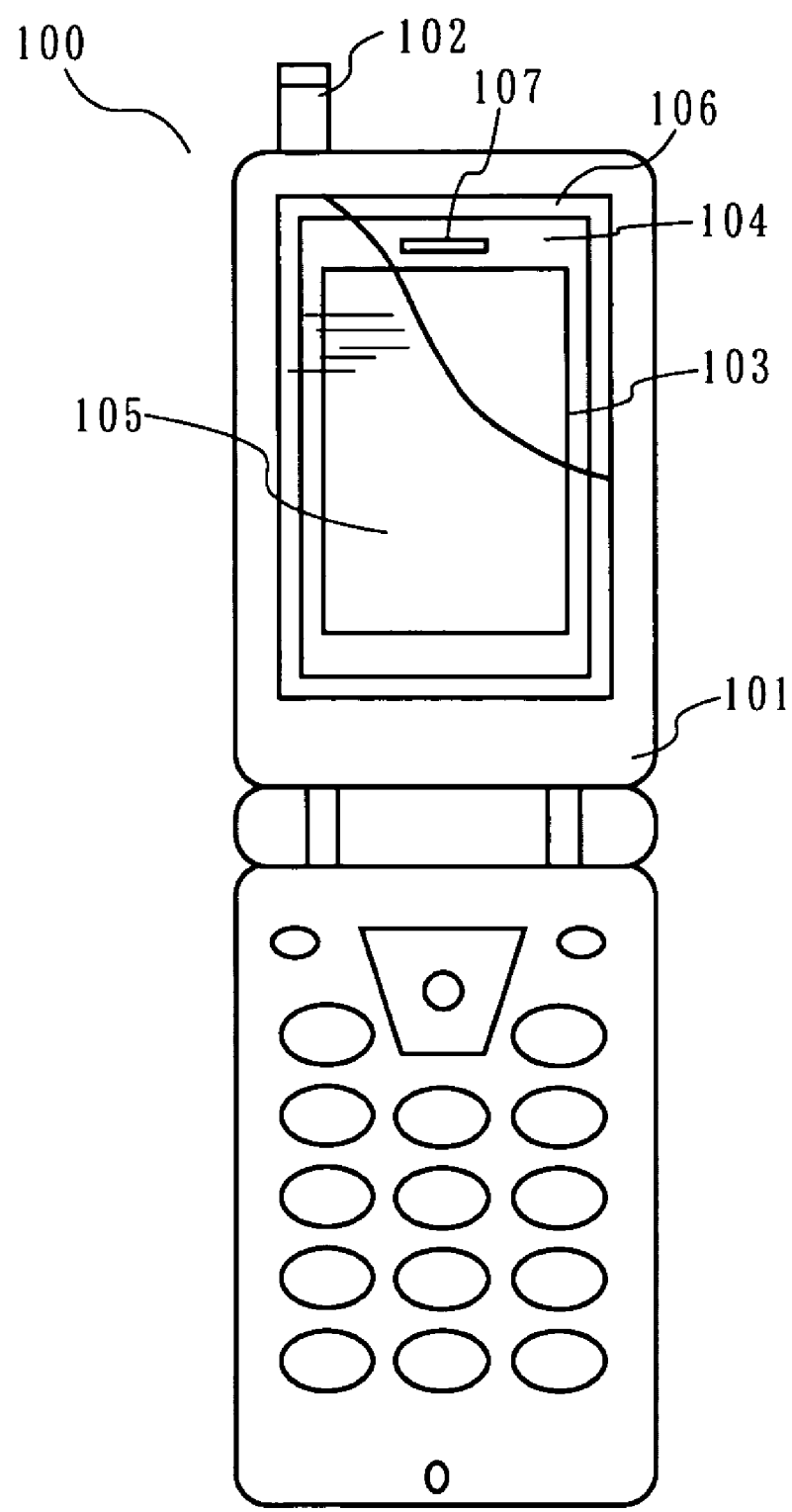
FIG. 3 is a plane view illustrating a mobile telephone according to a second embodiment which is partially cut out.
Figure 4:
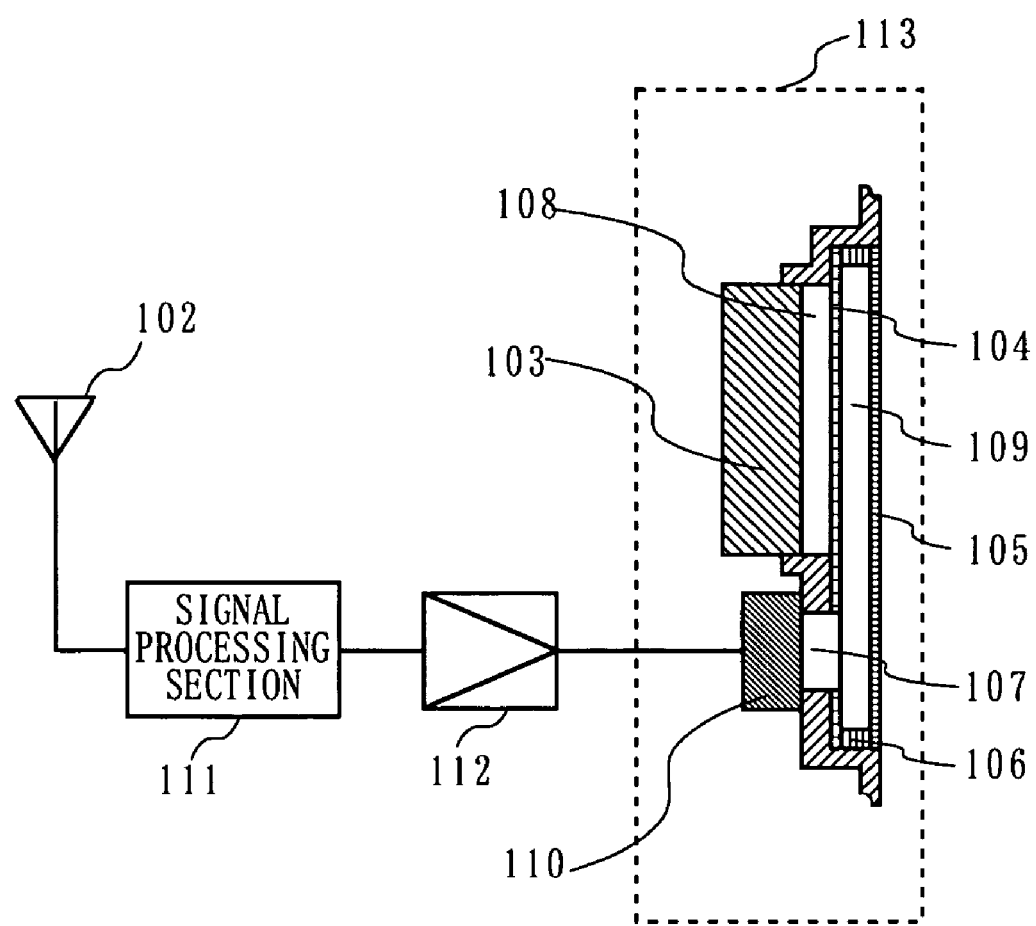
FIG. 4 is a block diagram illustrating the mobile telephone according to the second embodiment.
Figure 5:
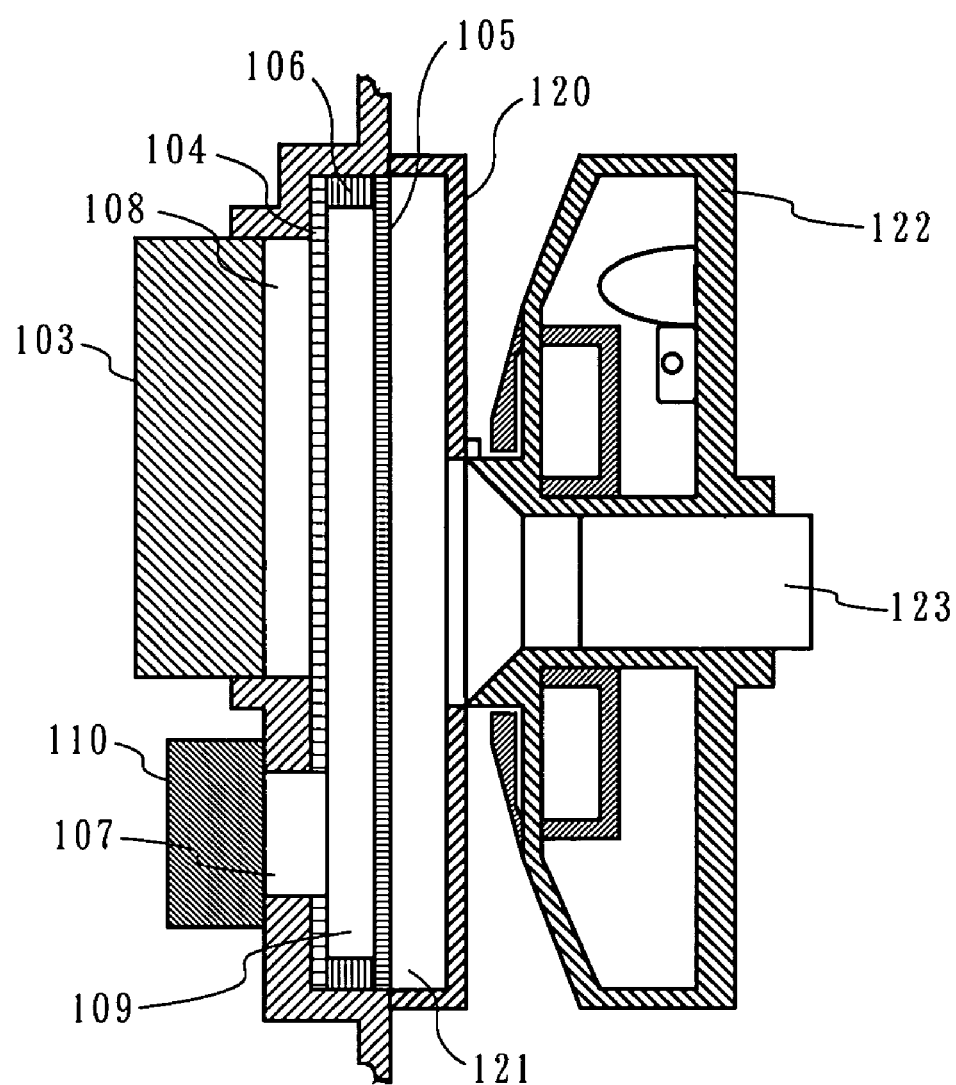
FIG. 5 is a diagram illustrating a measuring device for measuring the receiver characteristics of a sound reproducing apparatus according to the second embodiment.

With reference to FIGS. 3 to 5, a sound reproducing apparatus according to a second embodiment will be described below. The second embodiment describes a sound reproducing apparatus which is implemented as a mobile telephone. FIG. 3 is a plane view illustrating a mobile telephone according to the second embodiment which is partially cut out. FIG. 4 is a block diagram illustrating the mobile telephone according to the second embodiment.

In FIGS. 3 and 4, a mobile telephone 100 includes an outer case 101, an antenna 102, a display device 103, a board 104, a diaphragm panel 105, a spacer 106, a sound hole 107, an electroacoustic transducer 110, a signal processing section 111, and a signal amplification section 112. In FIG. 3, the outer case 101 contains electrical circuits and the like of the mobile telephone 100. The antenna 102 is mounted to the outer case 101. In FIG. 3, the diaphragm panel 105 is partially cut out. In FIG. 4, the signal processing section 111 is connected to the antenna 102 and to the signal amplification section 112. The signal amplification section 112 is connected to the signal processing section 111 and to the electroacoustic transducer 110. Note that the configuration of the sound reproducing apparatus 113 shown by the dotted line in FIG. 4 is the same as that of the first embodiment except for the outer shape of the outer case 101.

The operation of the mobile telephone 100 according to the second embodiment will be described below. A signal received by the antenna 102 is inputted to the signal processing section 111. In this example, an incoming speech signal indicating an incoming speech sound which is a speaking voice of a transmitter is received by the antenna 102. The signal processing section 111 performs predetermined signal processing on the signal inputted from the antenna 102. The processing includes, for example, the process of extracting an incoming speech signal from the inputted signal. The signal which has undergone signal processing is amplified by the signal amplification section 112 and then applied to the electroacoustic transducer 110. Then, as is the same manner as the first embodiment, by the application of an electrical signal to the electroacoustic transducer 110, sound is emitted from the diaphragm panel 105. Thus, the diaphragm panel 105 operates as a receiver which serves as a speaker for speech sound reproduction. Since substantially the entire surface of the diaphragm panel 105 is caused to vibrate by the sound pressure in a second space 109, a receiver is realized which provides a wide hearing range, i.e., the user can hear speech sounds with their ear being held to any point of the diaphragm panel 105.

The advantageous effect of a first space 108 in the second embodiment will be described below with reference to FIG. 5. FIG. 5 is a diagram illustrating a measuring device for measuring the receiver characteristics of the sound reproducing apparatus according to the second embodiment. In FIG. 5, the measuring device includes a measuring cover 120, an acoustic coupler 122, and a measuring microphone 123. The measuring cover 120 is mounted to a diaphragm panel 105 so as to provide a sealed space 121 between the measuring cover 120 and the diaphragm panel 105. The acoustic coupler 122 has acoustic characteristics of the auditory stimuli which conform to International Standard IEC (International Electro technical Commission). In the measuring device shown in FIG. 5, sound emitted from the diaphragm panel 105 is guided to the acoustic coupler 122 through the sealed space 121, and then the sound pressure frequency characteristics of the sound is measured by the measuring microphone 123.

Figure 6:
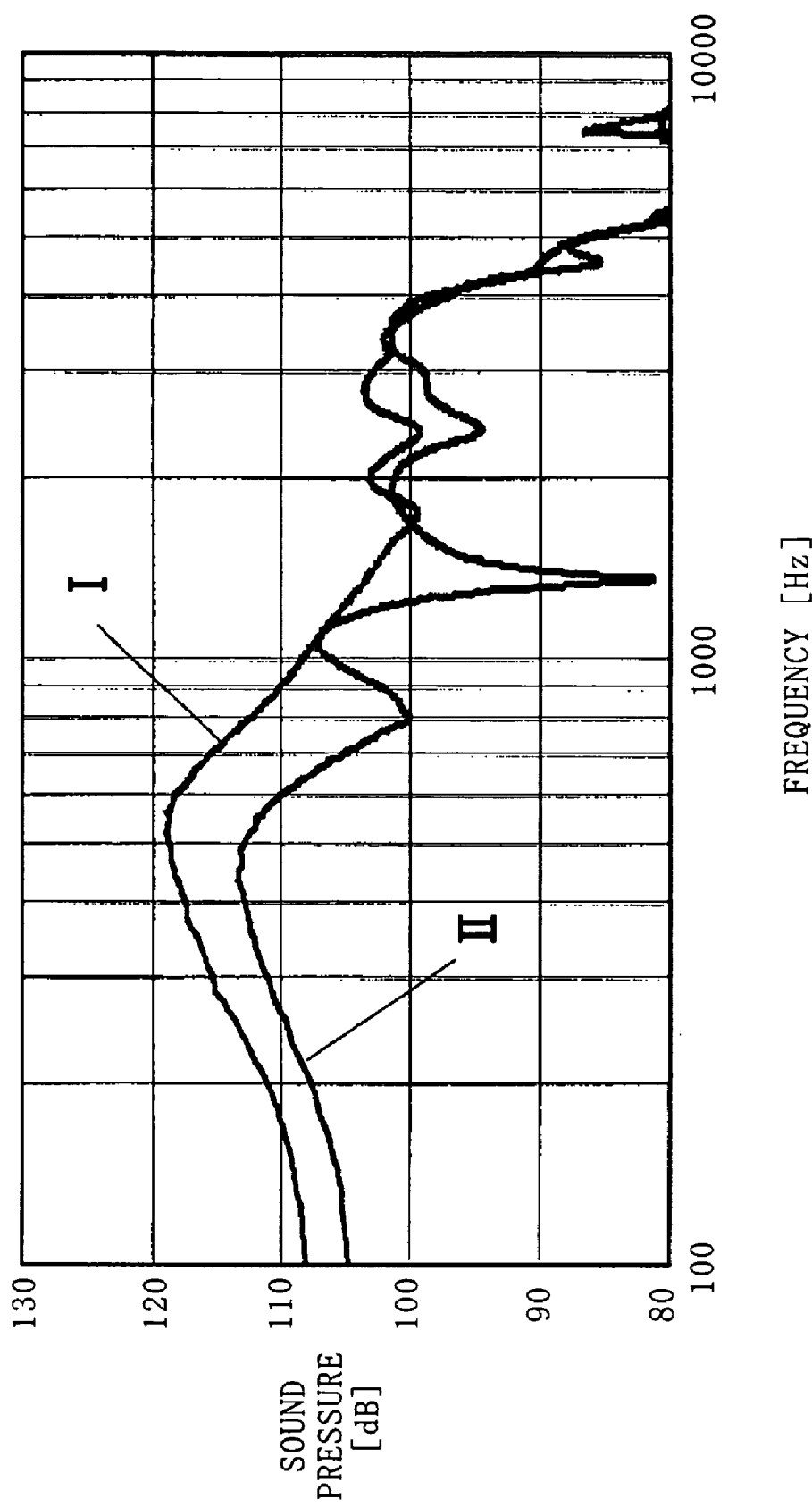
FIG. 6 is a diagram showing the results obtained by measuring the sound pressure frequency characteristics of a sound reproducing apparatus, by means of the measuring device shown in FIG. 5.

FIG. 6 is a diagram showing the results obtained by measuring the sound pressure frequency characteristics of a sound reproducing apparatus, by means of the measuring device shown in FIG. 5. In FIG. 6, the vertical axis represents the pressure of sound emitted from a sound reproducing apparatus, and the horizontal axis represents the frequency of the sound. In this example, the electroacoustic transducer 110 is an electrodynamic-type speaker with a diameter of 10 mm, the board 104 is composed of a transparent acrylic material with a material thickness of 0.65 mm, and the diaphragm panel 105 is composed of a transparent PET material with a length of 60 mm, a width of 40 mm, and a thickness of 0.190 mm. The air gap width of the first space 108 is 0.5 mm, the air gap width of the second space 109 is 0.2 mm, and the air gap width of the sealed space 121 provided in front of the diaphragm panel 105 is 0.2 mm.

The "I" shown in FIG. 6 indicates the sound pressure frequency characteristics obtained when the first space 108 is present at the back of the board 104. The "II" shown in FIG. 6 indicates the sound pressure frequency characteristics obtained when the first space 108 is not present at the back of the board 104. In the case where the first space 108 is absent, the board 104 is caused to vibrate by the pressure of sound emitted into the second space 109 from the electroacoustic transducer 110. Thus, the acoustic energy to cause the diaphragm panel 105 to vibrate is consumed, reducing the pressure of the sound emitted from the diaphragm panel 105. On the other hand, in the case where the first space 108 is present, the acoustic stiffness of the air in the first space 108 is high, and thus the vibration of the board 104 is suppressed. That is, in this case, although the material thickness of the board 104 is as thin as 0.65 mm, the board 104 functions as if it were a rigid body. Accordingly, the sound pressure level is higher in the frequency bands at or below 1 kHz than that in the case where the first space 108 is absent, by about 3 to 10 dB. As can be seen, by providing the first space 108, it is possible to significantly improve the loss of an acoustic energy caused by the board 104.

Figure 12:
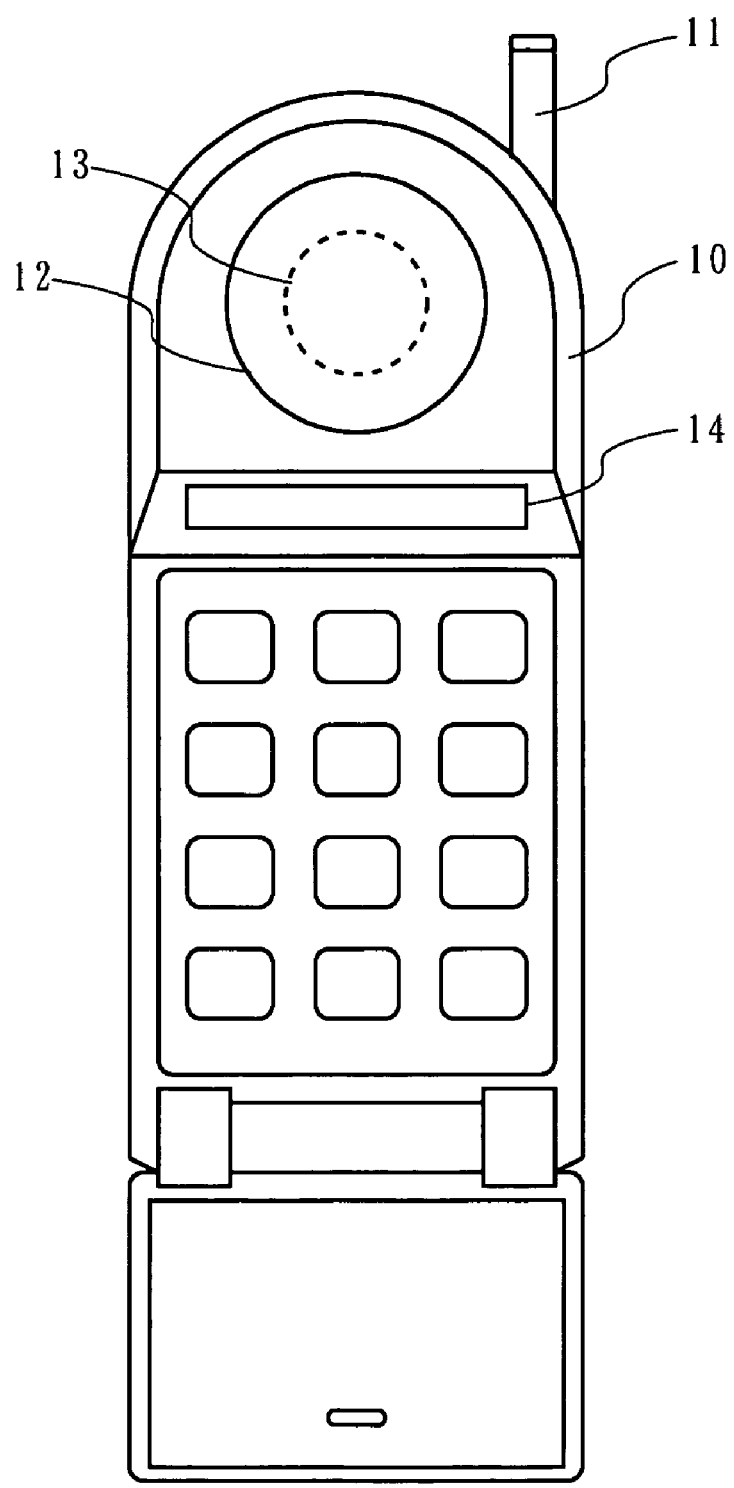
FIG. 12 is an external view of a mobile telephone having a conventional sound reproducing apparatus.

As described above, the mobile telephone 100 according to the second embodiment can also obtain the same advantageous effects as those obtained by the first embodiment. In the second embodiment, the signal applied to the electroacoustic transducer 110 is an incoming speech signal. In another example, a ringing signal indicating an incoming call, a music signal, or a signal indicating a sound effect of a game may be received by the antenna 102, and the received signal may be applied to the electroacoustic transducer 110. In this case, the diaphragm panel 105 functions as a loudspeaker for reproducing a ringing sound, music, or a sound effect of a game. In the case where the mobile telephone 100 according to the second embodiment functions as a videophone, the person the user is talking to is displayed on the display screen and their speaking voice is reproduced by the diaphragm panel 105. In a conventional sound reproducing apparatus in which the driver is directly mounted to the outer case, to reproduce sound with a sufficient sound pressure, the major part of the outer case needs to be used as a vibration surface. This limits the space for a display device, making it impossible to employ a large display screen (see FIG. 12). On the other hand, in the second embodiment, a method of acoustically driving the diaphragm panel 105 is employed, and therefore it is possible to provide a mobile telephone having a large display screen which conventional mobile telephones have been unable to employ.

(Third Embodiment)

A sound reproducing apparatus according to a third embodiment will be described below with reference to the drawings. The sound reproducing apparatus according to the third embodiment is also implemented as a mobile terminal apparatus, as with the first embodiment. The sound reproducing apparatus according to the third embodiment has two electroacoustic transducers.

Figure 7A:
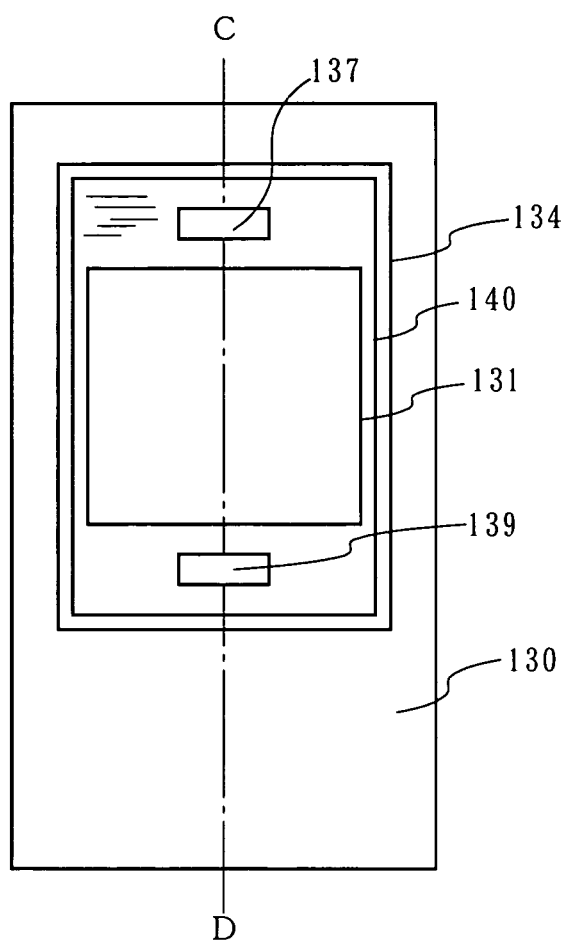
FIGS. 7A and 7B are diagrams illustrating a sound reproducing apparatus according to a third embodiment.
Figure 7B:
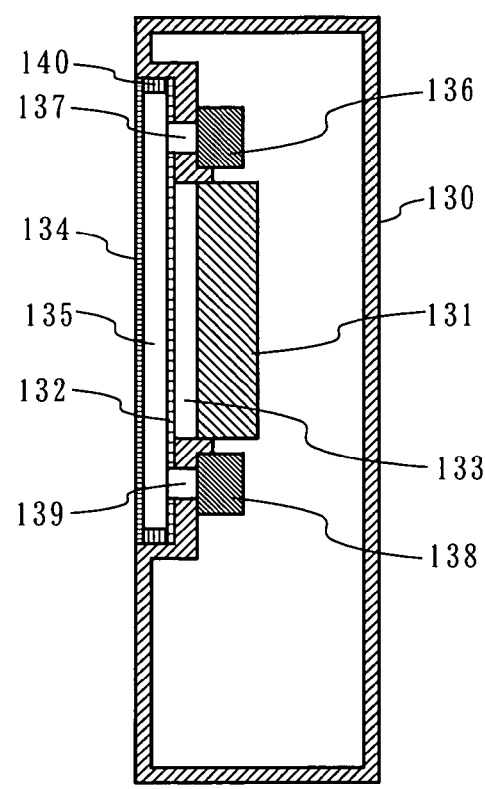

FIGS. 7A and 7B are diagrams illustrating the sound reproducing apparatus according to the third embodiment. FIG. 7A is a plane view illustrating the sound reproducing apparatus, and FIG. 7B is a cross-sectional view of the sound reproducing apparatus taken along a line C-D of FIG. 7A. In FIGS. 7A and 7B, the sound reproducing apparatus includes an outer case 130, a display device 131, a board 132, a diaphragm panel 134, a spacer 140, a first electroacoustic transducer 136, and a second electroacoustic transducer 138. In the third embodiment, a first sound hole 137 and a second sound hole 139 are each provided in the board 132 and the outer case 130. The first and second electroacoustic transducers 136 and 138 are arranged on the opposite side of the board 132 from the second space 135. The first electroacoustic transducer 136 is connected to the outer case 130 so as to cover the first sound hole 137. The second electroacoustic transducer 138 is connected to the outer case 130 so as to cover the second sound hole 139. Note that the configuration is the same as that of the first embodiment except for the first and second electroacoustic transducers 136 and 138 and the first and second sound holes 137 and 139. In addition, the operating principles that the diaphragm panel 134 is caused to vibrate by applying an electrical signal to at least one of the first and second electroacoustic transducers 136 and 138, are the same as those of the first embodiment.

Figure 8:
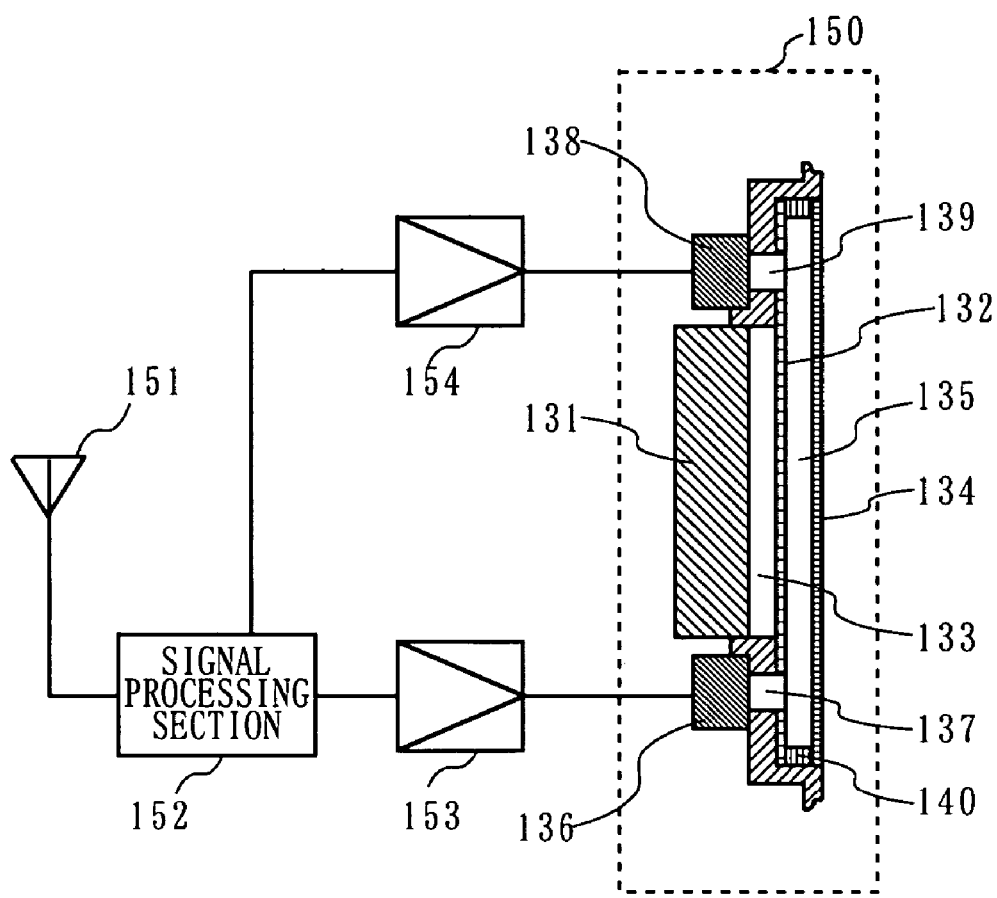
FIG. 8 is a block diagram illustrating a mobile terminal apparatus according to the third embodiment which is used as a mobile telephone.

The mobile terminal apparatus according to the third embodiment may be used as a mobile telephone such as the one described in the second embodiment. FIG. 8 is a block diagram illustrating the mobile terminal apparatus according to the third embodiment which is used as a mobile telephone. In FIG. 8, the mobile telephone includes a sound reproducing apparatus 150, an antenna 151, a signal processing section 152, a first signal amplification section 153, and a second signal amplification section 154. The sound reproducing apparatus 150 is a sound reproducing apparatus shown in FIG. 7B. The signal processing section 152 is connected to the antenna 151 and to the first and second signal amplification sections 153 and 154. The first signal amplification section 153 is connected to the first electroacoustic transducer 136. The second signal amplification section 154 is connected to the second electroacoustic transducer 138.

The operation of the mobile telephone shown in FIG. 8 will be described below. The antenna 151 receives a signal sent from the base station of the mobile telephone. The signal includes a ringing signal, an incoming speech signal indicating an incoming speech sound, an acoustic signal such as music, or an image signal such as a moving image or textual information. The signal received by the antenna 151 undergoes signal processing in the signal processing section 152, and then the processed signal is inputted to either the first signal amplification section 153 or the second signal amplification section 154. Specifically, if the signal received by the antenna 151 includes an incoming speech signal, the signal processing section 152 performs signal processing on the incoming speech signal and outputs the processed incoming speech signal to the first signal amplification 153. The incoming speech signal is then amplified by the first signal amplification section 153, and then the amplified signal is applied to the first electroacoustic transducer 136. In this case, the diaphragm panel 134 operates as a receiver. On the other hand, if the signal received by the antenna 151 includes a signal other than an incoming speech signal, the signal processing section 152 performs signal processing on the signal and outputs the processed signal to the second signal amplification section 154. Here, a signal other than an incoming speech signal includes, for example, the aforementioned acoustic signal, a ringing signal indicating that an incoming call is received, a musical signal downloaded from the Internet, or the like. These signals are amplified by the second signal amplification section 154, and then the amplified signal is applied to the second electroacoustic transducer 138. In this case, the diaphragm panel 134 operates as a loudspeaker.

Generally, in an electroacoustic transducer that operates as a receiver, the minimum resonance frequency of a vibration system is set to about 250 Hz to 550 Hz, in consideration of the leakage of sound from the ear. Since it is assumed that the receiver will be held close to the user's ear when the user is listening, the input signal to an electroacoustic transducer which operates as a receiver is also was 40 mW or below. Therefore, even though the minimum resonance frequency of the electroacoustic transducer is low, abnormal sounds or breakage caused by large amplitudes of the vibration system will not occur. On the other hand, in the case of loudspeakers which reproduce louder sound than receivers, a signal with a value as high as 200 mW or above is applied. Therefore, it is difficult to bring the minimum resonance frequency of the electroacoustic transducer which operates as a loudspeaker to "too low" levels, and thus such an electroacoustic transducer requires the structure and shape that enable reproduction of high sound pressure levels. For these reasons, it is difficult to allow one electroacoustic transducer to perform sound reproduction of two different applications, i.e., a receiver and a loudspeaker. The third embodiment employs a configuration having an electroacoustic transducer which operates as a receiver and an electroacoustic transducer which operates as a loudspeaker. Thus, the third embodiment has a more practical configuration than that of the second embodiment in which one electroacoustic transducer is allowed to operate as a receiver and a loudspeaker.

When listening to an incoming speech sound reproduced by the receiver, the user usually listens to the sound with their ear held close to the diaphragm panel. Meanwhile, melody sounds and the like reproduced by the loudspeaker are generally reproduced more loudly than incoming speech sounds. Thus, when the user is holding the mobile terminal apparatus close to their ear to listen to an incoming speech sound, if a loud melody sound is reproduced, the user's hearing may be damaged by the reproduced loud melody sound. In consideration of this, in the third embodiment, two electroacoustic transducers are placed apart from each other according to their applications, and thus the direct influence from the electroacoustic transducers is small, and safety is higher than that of the second embodiment which employs one electroacoustic transducer.

(Fourth Embodiment)

A sound reproducing apparatus according to a fourth embodiment will be described below. The sound reproducing apparatus according to the fourth embodiment is also implemented as a mobile terminal apparatus, as with the first embodiment. In the sound reproducing apparatus according to the fourth embodiment, a touch panel composes a diaphragm panel and a board.

Figure 9A:
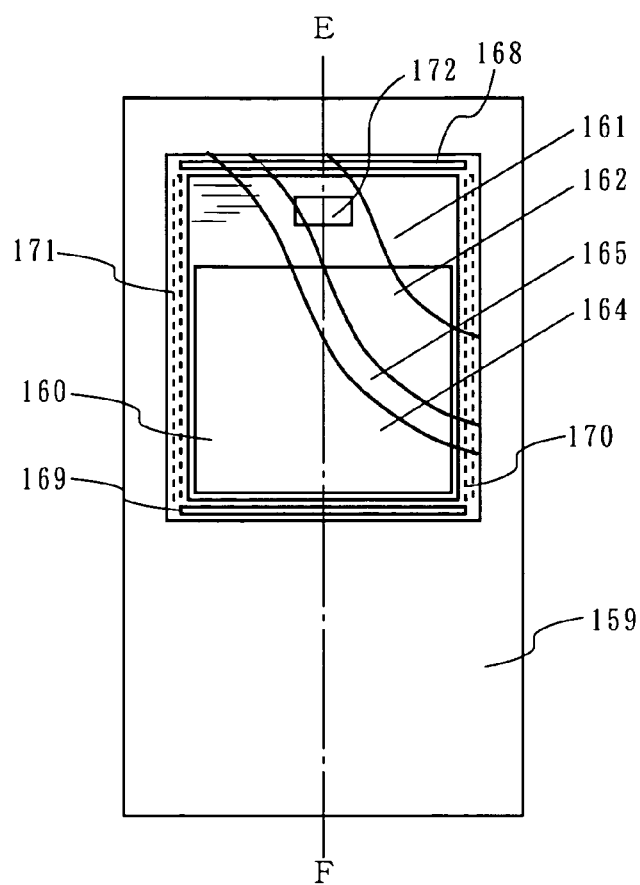
FIGS. 9A and 9B are diagrams illustrating a sound reproducing apparatus according to a fourth embodiment.
Figure 9B:
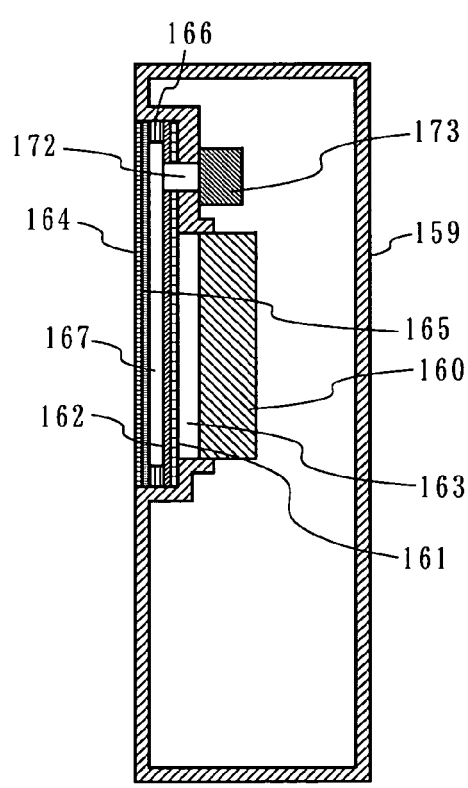

FIGS. 9A and 9B are diagrams illustrating the sound reproducing apparatus according to the fourth embodiment. FIG. 9A is a plane view illustrating the sound reproducing apparatus which is partially cut out, and FIG. 9B is a cross-sectional view of the sound reproducing apparatus taken along a line E–F of FIG. 9A.

In FIGS. 9A and 9B, the sound reproducing apparatus includes an outer case 159, a display device 160, a board 161, a first transparent electrode 162, a diaphragm panel 164, a second transparent electrode 165, a spacer 166, resistance detection electrodes 168 to 171, and an electroacoustic transducer 173.

The sound reproducing apparatus according to the fourth embodiment is different from the sound reproducing apparatus according to the first embodiment in that the first and second transparent electrodes 162 and 165 and the resistance detection electrodes 168 to 171 are further provided. The first transparent electrode 162 is connected to the board 161 so as to face a second space 167. The second transparent electrode 165 is connected to the diaphragm panel 164 so as to face the second space 167. The resistance detection electrodes 168 and 169 are provided on the short sides of the spacer 166 and between the spacer 166 and the second transparent electrode 165. Thus, the resistance detection electrodes 168 and 169 are in contact with the second transparent electrode 165. The resistance detection electrodes 170 and 171 are provided on the long sides of the spacer 166 and between the spacer 166 and the first transparent electrode 162. Thus, the resistance detection electrodes 170 and 171 are in contact with the first transparent electrode 162.

The sound reproducing apparatus according to the fourth embodiment is also different from the sound reproducing apparatus according to the first embodiment in that a sound hole 172 provided in the board 161, the first transparent electrode 162, and the outer case 159 has a rectangular shape. Except for this and the aforementioned differences, the configuration of the sound reproducing apparatus according to the fourth embodiment is the same as that of the first embodiment.

The operation that sound is reproduced by vibration of the diaphragm panel 164 of the sound reproducing apparatus is the same as that of the first embodiment. In the sound reproducing apparatus according to the fourth embodiment, the touch panel is composed of the first and second transparent electrodes 162 and 165 and the resistance detection electrodes 168 to 171. Specifically, when the diaphragm panel 164 is pressed with a pen or a user's finger, the first transparent electrode 162 and the second transparent electrode 165 come into contact with each other. The coordinates indicating the touch position is detected by the resistance detection electrodes 168, 169, 170, and 171, as a change in resistance values. Based on the detected coordinates, the operation of the sound reproducing apparatus is controlled. Although not shown in FIGS. 9A and 9B, an operation menu, icons, and the like may be displayed on the display screen of the display device 160.

As described above, according to the fourth embodiment, a sound reproducing apparatus is realized in which the touch panel, which serves as an input device, and the diaphragm panel for sound reproduction can be integrated into one component, and sound is reproduced from the touch panel without blocking an image displayed on the display screen. The detection method of the touch panel is not limited to the one using a change of electrical resistances; a method using a light or capacitance, for example, may be employed.

The sound reproducing apparatus shown in FIGS. 9A and 9B includes a circuit for processing a signal detected by the touch panel, a circuit for controlling the sound reproducing apparatus using the processed signal, and the like; however, these circuits are not directly related to sound reproduction, the detailed descriptions thereof are omitted here.

As has been described above, the present invention can give the user the sense that the sound is being reproduced from the display device, while preventing the degradation of the quality of reproduced sound. In addition, by substantially sealing the first space, a reduction in the pressure of reproduced sound can be prevented, and the sound reproducing apparatus can be made thinner.

By applying a sound reproducing apparatus according to the present invention to a mobile telephone and arranging a diaphragm panel on the display screen of the mobile telephone, the diaphragm panel can operate as a receiver for reproducing incoming speech sounds. In this case, since an incoming speech sound is reproduced from the front side of the diaphragm panel, the user can hear the sound from a wide surface area of the diaphragm panel. Accordingly, a mobile telephone can be realized which allows the user, especially the elderly, to hear incoming speech sounds more easily. In addition, by increasing the level of a signal to be inputted to the sound reproducing apparatus, the diaphragm panel can operate as a loudspeaker. This enables the user to have a conversation while seeing an image of the person on the other end of the conversation, as is a videophone. Further, since an image and a sound are emitted from the same surface, the user can get the sense that the sound is coming from the image. Accordingly, a sound reproducing apparatus suitable for simultaneous reproduction of sounds and images is realized.

By allowing a surface film of a touch panel to also serve as a diaphragm panel, a mobile terminal apparatus in which an input device and a sound reproducing apparatus are integrated into one unit is realized.

Although the first to fourth embodiments introduce the structure of an electrodynamic-type speaker as an example of the electroacoustic transducer 26, the electroacoustic transducer 26 may employ other schemes as long as the scheme has the function of emitting sound from a diaphragm. For example, the transducer scheme of the electroacoustic transducer 26 may be of an electromagnetic type, a piezoelectric type, or an electrostatic type.

As used herein, the phrase "to seal the first space" does not mean that the first space must be completely sealed. The first space 28 may be a substantially sealed space. This will be described below with reference to FIG. 10.

Figure 10:
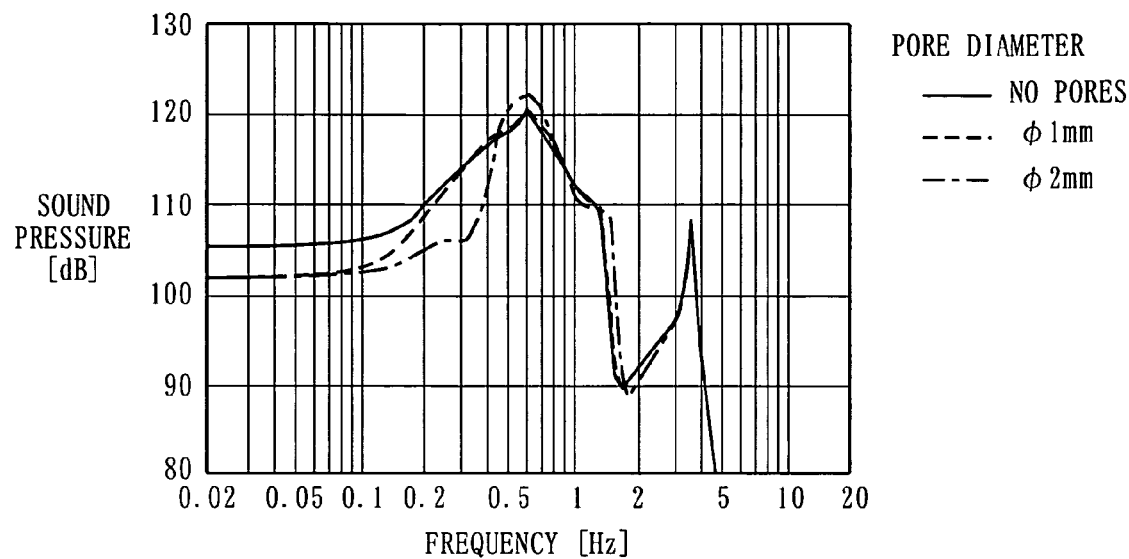
FIG. 10 is a diagram showing the sound pressure frequency characteristics of a sound reproducing apparatus according to the present invention.
Figure 11:
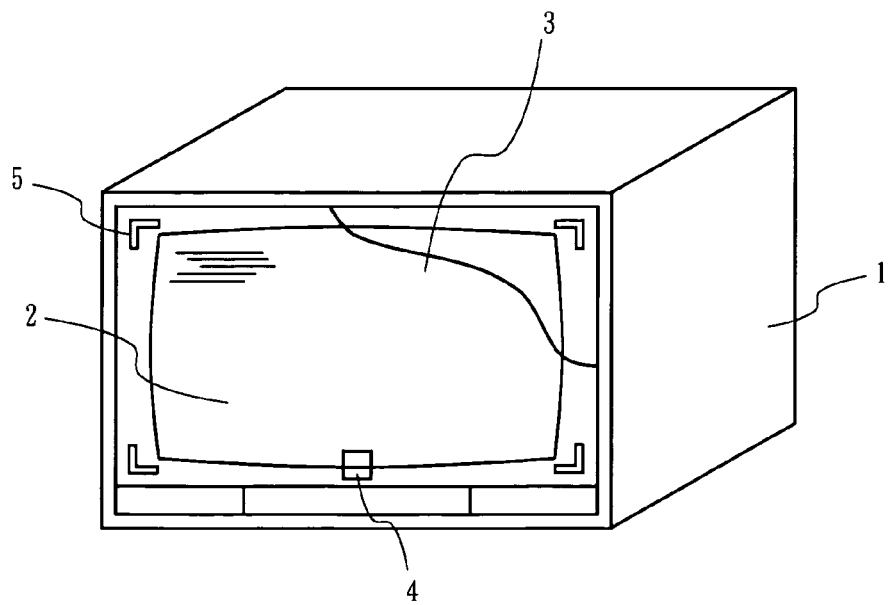
FIG. 11 is an external perspective view of a television set having a conventional sound reproducing apparatus.

FIG. 10 is a diagram showing the sound pressure frequency characteristics of a sound reproducing apparatus according to the present invention. FIG. 10 shows the results obtained by measuring sound emitted from the diaphragm panel of the sound reproducing apparatus according to the second embodiment, with the acoustic coupler shown in FIG. 5. In FIG. 10, the substrate and the diaphragm panel each have a size of 40×60 mm and a material thickness of 0.2 mm. The solid line shown in FIG. 10 represents sound pressure frequency characteristics obtained when the first space has no aperture provided therein. The dotted line shown in FIG. 10 represents sound pressure frequency characteristics obtained when the first space has an aperture with a diameter of 1 mm. The dash-dotted line shown in FIG. 10 represents sound pressure frequency characteristics obtained when the first space has an aperture with a diameter of 2 mm.

As is clear from FIG. 10, when the first space has an aperture, the sound pressure is lower in the frequency bands at or below 400 Hz than the case where the first space 1 has no aperture. This results from the fact that the acoustic stiffness of the first space is reduced because of the aperture, and accordingly the force to suppress vibration of the board 104 is reduced. In the case of the aperture with a diameter of 1 mm, although the sound pressure level is reduced at low frequencies, at or below 300 Hz, a reduction in the sound level is not recognized in the frequency bands above 300 Hz. In the case where the sound reproducing apparatus is implemented as a mobile telephone, the frequency bands required to reproduce incoming speech sounds will be above 300 Hz. Therefore, in the example shown in FIG. 10, in the case where the sound reproducing apparatus operates as the receiver of a mobile telephone, even if the first space has an aperture with a diameter of about 1 mm, there will be no problems. As described above, although it is preferable to completely seal the first space, even if the first space has some opening, sufficient advantageous effects can be obtained. In FIG. 5, the acoustic coupler acts as an acoustic load, and thereby suppressing vibration of the diaphragm panel 105. Thus, it is presumed that in FIG. 5, the board 104 would vibrate more easily than the case without the acoustic coupler. That is, in the case of normal use of a mobile telephone, an acoustic coupler is not provided, and thus the influence of an aperture would be smaller in practice than the case of FIG. 10. In view of this, in practice, even if the aperture has a diameter of 1 mm or greater, there will be no problems in some cases.

Although the first to fourth embodiments described the case where the sound reproducing apparatus is implemented as a mobile terminal apparatus which is a mobile electronic apparatus, the sound reproducing apparatus according to the present invention may also be used as a stationary electronic apparatus, such as a game machine, a personal computer, or a television set.

Moreover, in the first, second, and fourth embodiments, one electroacoustic transducer and one sound hole are provided. However, as described in the third embodiment, it is also possible to provide a plurality of electroacoustic transducers and a plurality of sound holes. In the case of a plurality of electroacoustic transducers and sound holes, by applying the same signal to all the electroacoustic transducers, the sound can be reproduced at high volumes. In addition, it is also possible to apply a stereo signal to the two electroacoustic transducers.

In another configuration, for example, a poster in which an image is illustrated or a photograph may be used instead of a display device. For example, in the case where a sound reproducing apparatus is applied to a photo frame, the user can get the sense that the sound is being reproduced from the photograph.

The sound reproducing apparatus according to the present invention can be used not only as a mobile terminal apparatus such as a mobile telephone or a PDA, but also as a stationary personal computer or a television set.

While the invention has been described in detail, the foregoing description is in all aspects illustrative and not restrictive. It is understood that numerous other modifications and variations can be devised without departing from the scope of the invention.

What is claimed is:

1. A sound reproducing apparatus comprising:
   a display unit operable to display an image on a display surface;
   a board composed of a material which transmits visible light and arranged such that a first space is provided between the display surface of the display unit and the board;
   a diaphragm panel composed of a material which transmits visible light and arranged on the opposite side of the board from the display unit such that a second space is provided between the board and the diaphragm panel; and
   at least one electroacoustic transducer for emitting sound into the second space,
   wherein the board has a sound hole, and
   wherein the electroacoustic transducer is arranged so as to cover the sound hole.

2. The sound reproducing apparatus according to claim 1, further comprising:
   a case having an opening which is covered by the diaphragm panel,
   wherein the case contains therein the board, the display unit, and the electroacoustic transducer.

3. The sound reproducing apparatus according to claim 2, wherein the diaphragm panel is composed of a touch panel.

4. The sound reproducing apparatus according to claim 2, further comprising:
   an antenna for receiving a signal; and
   a signal processing unit operable to perform predetermined signal processing on the signal received by the antenna and inputting the processed signal to the electroacoustic transducer.

5. The sound reproducing apparatus according to claim 4, wherein
   a number of the at least one electroacoustic transducer is two, and
   the signal processing unit inputs to one of the two electroacoustic transducers a signal received by the antenna if the signal includes an incoming speech sound signal, and inputs to the other one of the two electroacoustic transducers a signal received by the antenna if the signal includes a signal other than an incoming speech sound signal.

* * * * *